United States Patent
Shimauchi (10) Patent No.: US 11,794,549 B2
(45) Date of Patent: Oct. 24, 2023

(54) VEHICLE AIR-CONDITIONER

(71) Applicant: TOYOTA JIDOSHA KABUSHIKI KAISHA, Aichi-ken (JP)

(72) Inventor: Takayuki Shimauchi, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 303 days.

(21) Appl. No.: 17/316,718

(22) Filed: May 11, 2021

(65) Prior Publication Data

US 2022/0024277 A1 Jan. 27, 2022

(30) Foreign Application Priority Data

Jul. 27, 2020 (JP) ................. 2020-126392

(51) Int. Cl.
*B60H 1/00* (2006.01)
*B60L 58/26* (2019.01)

(52) U.S. Cl.
CPC ......... *B60H 1/00278* (2013.01); *B60H 1/004* (2013.01); *B60H 1/00792* (2013.01); *B60H 1/00821* (2013.01); *B60L 58/26* (2019.02); *B60H 2001/003* (2013.01); *B60L 2240/545* (2013.01)

(58) Field of Classification Search
CPC ............ B60H 1/00278; B60H 1/00821; B60H 1/00849; B60H 1/00792; B60H 1/00735; B60H 2001/002
USPC ................................................. 454/69–165
See application file for complete search history.

(56) References Cited

U.S. PATENT DOCUMENTS

| | | | | |
|---|---|---|---|---|
| 5,490,572 A | * | 2/1996 | Tajiri | B60L 1/02 180/68.5 |
| 6,092,592 A | * | 7/2000 | Toyoshima | B60H 1/0005 454/126 |
| 6,135,201 A | * | 10/2000 | Nonoyama | B60H 1/00064 237/12.3 A |
| 9,202,316 B1 | * | 12/2015 | Trudell | G07C 5/00 |
| 10,759,252 B2 | * | 9/2020 | Lee | H01M 10/613 |
| 2007/0089442 A1 | * | 4/2007 | Tsuchiya | B60L 1/02 62/186 |

(Continued)

FOREIGN PATENT DOCUMENTS

JP 2003252023 A 9/2003
JP 2010-036723 A 2/2010

(Continued)

*Primary Examiner* — Ko-Wei Lin
(74) *Attorney, Agent, or Firm* — HAUPTMAN HAM, LLP (57) ABSTRACT

When the temperature of a device that is constituted by an electric component or an electronic component and that is arranged below a rear seat exceeds a predetermined value during air-conditioning operation in an internal-air circulation mode, an air-conditioning switching action by which a rear air-conditioning unit is switched from the internal-air circulation mode to an external-air introduction mode is performed, and thereby ventilation of the vehicle cabin is performed. Therefore, before the surrounding temperature of an occupant significantly rises due to heat generated by the device and the occupant feels uncomfortable, by restraining the surrounding temperature from rising through external-air introduction to avoid a situation in which occupant feels uncomfortable, it is possible to maintain comfortableness in the vehicle cabin.

9 Claims, 6 Drawing Sheets

(56) References Cited

U.S. PATENT DOCUMENTS

| | | | | |
|---|---|---|---|---|
| 2016/0129805 A1* | 5/2016 | Garfinkel | ............... | B60L 58/27 |
| | | | | 180/68.5 |
| 2018/0131052 A1* | 5/2018 | Reibling | ............. | H01M 10/633 |
| 2020/0313256 A1* | 10/2020 | Kuronuma | ........ | H01M 10/6563 |
| 2020/0361280 A1* | 11/2020 | Hashimoto | ........ | B60H 1/00428 |
| 2021/0039476 A1 | 2/2021 | Suzuki et al. | | |
| 2021/0053419 A1* | 2/2021 | Fukazawa | .......... | B60H 1/00742 |

FOREIGN PATENT DOCUMENTS

| | | |
|---|---|---|
| JP | 2010-280352 A | 12/2010 |
| JP | 2019-119437 A | 7/2019 |
| JP | 2019-196032 A | 11/2019 |
| WO | 01/15922 A1 | 3/2001 |

\* cited by examiner

VEHICLE AIR-CONDITIONER

CROSS-REFERENCE TO RELATED APPLICATION

This application claims priority to Japanese Patent Application No. 2020-126392 filed on Jul. 27, 2020, incorporated herein by reference in its entirety.

BACKGROUND

1. Technical Field

The disclosure relates to a vehicle air-conditioner. Particularly, the disclosure relates to a measure to increase comfortableness in a vehicle cabin.

2. Description of Related Art

Conventionally, in a vehicle air-conditioner, comfortableness in a vehicle cabin is increased by an air-conditioning control depending on an environment in the vehicle cabin and the like. Japanese Unexamined Patent Application Publication No. 2003-252023 discloses a vehicle air-conditioner including wind direction changing means that can change a blowing direction of air-conditioning wind. The vehicle air-conditioner detects a temperature distribution in a whole of the vehicle cabin using a CCD camera or an infrared sensor, and changes the blowing direction of the air-conditioning wind based on a detection result of the temperature distribution. Specifically, when the vehicle cabin includes a region where a surface temperature is a predetermined temperature or higher, the vehicle air-conditioner detects high-temperature position where the temperature is highest, and blows the air-conditioning wind having an adjusted temperature, toward the high-temperature position. Thereby, the vehicle air-conditioner performs a comfortable air-conditioning depending on an occupant's sense.

SUMMARY

However, the vehicle air-conditioner disclosed in Japanese Patent Application Publication No. 2003-252023 detects the temperature distribution on a surface of an interior item such as a seat in the vehicle cabin or a surface of an occupant that sits on the seat. Therefore, before the temperature of the surface of the interior item or the surface of the occupant becomes high, the surface is not detected as the high-temperature position, and until the high-temperature position is detected, the blowing direction of the air-conditioning wind is not changed. Therefore, in the case where an electric component or the like that exists below or within the interior item generates heat, until the temperature of the surface of the interior item or the temperature of the surface of the occupant (for example, in the case where a component that exists below or within a seat generates heat, an occupant that sits on the seat) becomes high due to the heat generated by the electric component, the surface is not detected as the high-temperature position, and the blowing direction of the air-conditioning wind is not changed. That is, the blowing direction of the air-conditioning wind is not changed until the temperature of the surface becomes high and the occupant feels uncomfortable. As a result, it takes time before the occupant feels comfortable after the blowing direction of the air-conditioning wind is changed, and there is room for improvement in increase in comfortableness in the vehicle cabin.

The disclosure has been made in view of such a point, and an object of the disclosure is to provide a vehicle air-conditioner that can increase the comfortableness in the vehicle cabin even when a component to generate heat is installed below or within an interior item in the vehicle cabin.

A solution of the disclosure for achieving the object is a vehicle air-conditioner that allows an external-air introduction mode to be set as a suction port mode for air-conditioning operation, the external-air introduction mode being a mode in which external air is introduced into a vehicle cabin. The vehicle air-conditioner includes: a device that is constituted by an electric component or an electronic component and that is installed below an interior item in the vehicle cabin or within the interior item; and a temperature detector that is capable of detecting the temperature of the device, in which an air-conditioning switching action is performed when the temperature of the device that is detected by the temperature detector exceeds a predetermined value, the air-conditioning switching action being an action by which the suction port mode is set to the external-air introduction mode.

With the specifying matters, when the temperature (the temperature of the device that is detected by the temperature detector) of the device installed below the interior item in the vehicle cabin or within the interior item exceeds the predetermined value, the air-conditioning switching action is performed, and the suction port mode is set to the external-air introduction mode. That is, ventilation of the vehicle cabin is performed by the external-air introduction mode. Thereby, before the surrounding temperature of the occupant significantly rises due to the heat generated by the device and the occupant feels uncomfortable, by restraining the surrounding temperature from rising through the external-air introduction to avoid a situation in which the occupant feels uncomfortable, it is possible to maintain the comfortableness in the vehicle cabin.

The vehicle air-conditioner may allow a FACE mode to be set as a blowing mode for the air-conditioning operation, the FACE mode being a mode in which air-conditioning wind is blown toward an occupant, and in the air-conditioning switching action, the blowing mode may be set to the FACE mode.

Thereby, by the air-conditioning switching action, the external air for the ventilation is blown toward the occupant (particularly, toward an upper body of the occupant). Therefore, it is possible to surely avoid the occupant feeling uncomfortable as a result of a significant rise in the surrounding temperature of the occupant due to the heat generated by the device, and it is possible to contribute to the maintenance of the comfortableness in the vehicle cabin. Further, generally, in the FACE mode, pressure loss in a duct is smaller and wind volume is larger, than in other blowing modes. Also for this reason, it is possible to contribute to the maintenance of the comfortableness in the vehicle cabin, by setting the FACE mode.

A front seat and a rear seat may be disposed in the vehicle cabin as the interior item, the vehicle air-conditioner may include a front air-conditioning unit that blows air-conditioning wind toward the front seat and a rear air-conditioning unit that blows the air-conditioning wind toward the rear seat, the device may be installed below or within the rear seat, and in the air-conditioning switching action, a suction port mode of the rear air-conditioning unit may be set to the external-air introduction mode and air-conditioning performance of the rear air-conditioning unit may be increased.

Thereby, when the temperature of the device installed below or within the rear seat exceeds the predetermined value, the rear air-conditioning unit performs the air-conditioning switching action, so that the suction port mode is set to the external-air introduction mode and the air-conditioning performance is increased. For example, the rear air-conditioning unit is actuated, and the air-conditioning wind is blown toward the rear seat (toward an occupant that sits on the rear seat). Thereby, before the surrounding temperature of the occupant that sits on the rear seat significantly rises due to the heat from the device and the occupant feels uncomfortable, the rear air-conditioning unit restrains the surrounding temperature from rising and avoids the occupant feeling uncomfortable, so that it is possible to maintain the comfortableness in the vehicle cabin.

The electric component may be a secondary battery that is charged by receiving electric power, the electronic component may be an electric item that is connected to an electronic apparatus and that supplies the electric power to the electronic apparatus, and the air-conditioning switching action is performed, with a condition that at least one of the temperature of the secondary battery and the temperature of the electric item exceeds a predetermined value, when the electric power is supplied to the electronic apparatus through the electric item during charge of the secondary battery, the temperature of the secondary battery and the temperature of the electric item being detected by the temperature detector.

For example, in a plug-in hybrid vehicle, while the secondary battery is charged with electric power from an external power source, part of the electric power from the external power source is supplied to the electronic apparatus (a game machine or the like) through the electric item, and the electronic apparatus is actuated. Thereby, the vehicle cabin is used as a space similar to a house (generally called a my-room charge mode). Further, while the secondary battery is charged with electric power generated using dynamic power from an internal combustion engine, part of the electric power is supplied to the electronic apparatus through the electric item, and the electronic apparatus is actuated (generally called my-room electricity generation mode). When the vehicle is used in these ways, the generated heat amount of the secondary battery tends to become large due to the charge, and the generated heat amount of the electric item tends to become large due to the use of the electronic apparatus. That is, there is a high possibility that the surrounding temperature of the occupant significantly rises and the occupant feels uncomfortable. In the solution, when the vehicle is used in these ways, the air-conditioning switching action is executed when the predetermined condition (the temperature of the device exceeds the predetermined value) is satisfied. Thereby, it is possible to maintain high comfortableness in the vehicle cabin at the time of a my-room mode (the my-room charge mode or the my-room electricity generation mode), and it is possible to improve the practicality of the my-room mode.

The suction port mode may be set to an internal-air circulation mode until the temperature in the vehicle cabin reaches a predetermined temperature during the air-conditioning operation in the vehicle cabin, the internal-air circulation mode being a mode in which air in the vehicle cabin is circulated, and the air-conditioning switching action may be performed when the temperature of the device that is detected by the temperature detector exceeds the predetermined value in a state where the temperature in the vehicle cabin has reached the predetermined temperature during the air-conditioning operation in the vehicle cabin.

The "state where the temperature in the vehicle cabin has reached the predetermined temperature" means a state where the temperature in the vehicle cabin has reached a temperature equal to or lower than the predetermined temperature (for example, a target temperature in the vehicle cabin) during a cooling operation in the vehicle cabin, and means a state where the temperature in the vehicle cabin has reached a temperature equal to or higher than the predetermined temperature during a heating operation in the vehicle cabin. That is, the "state where the temperature in the vehicle cabin has reached the predetermined temperature" means a state where the temperature in the vehicle cabin has reached a temperature that allows the comfortableness in the vehicle cabin to be secured.

In the external-air introduction mode, the vehicle air-conditioner generates the air-conditioning wind by adjusting the temperature of the introduced external air (for example, by cooling the external air having a high temperature to a target temperature), and blows the air-conditioning wind into the vehicle cabin. Thereby, in the external-air introduction mode, air-conditioning load is higher than in the internal-air circulation mode in which the air-conditioning wind is generated while the air in the vehicle cabin is circulated. In the solution, the suction port mode is set to the internal-air circulation mode until the temperature in the vehicle cabin reaches the predetermined temperature during the air-conditioning operation in the vehicle cabin, that is, until the temperature in the vehicle cabin reaches the temperature that allows the comfortableness in the vehicle cabin to be secured, and the air-conditioning switching action is performed when the temperature of the device exceeds the predetermined value in the state where the temperature in the vehicle cabin has reached the predetermined temperature. Therefore, it is possible to achieve both the securement of the comfortableness in the vehicle cabin and the enhancement in energy efficiency by keeping the air-conditioning load as low as possible.

In the disclosure, when the temperature of the device installed below the interior item in the vehicle cabin or within the interior item exceeds the predetermined value, the air-conditioning switching action by which the suction port mode is set to the external-air introduction mode is performed, and thereby the ventilation of the vehicle cabin is performed. Therefore, before the surrounding temperature of the occupant significantly rises due to the heat generated by the device and the occupant feels uncomfortable, by restraining the surrounding temperature from rising through the external-air introduction to avoid a situation in which the occupant feels uncomfortable, it is possible to maintain the comfortableness in the vehicle cabin.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the disclosure will be described below based on the drawings. In the embodiment, a case where the disclosure is applied to a plug-in hybrid vehicle will be described.

Schematic Configuration of Plug-In Hybrid Vehicle

Figure 1:
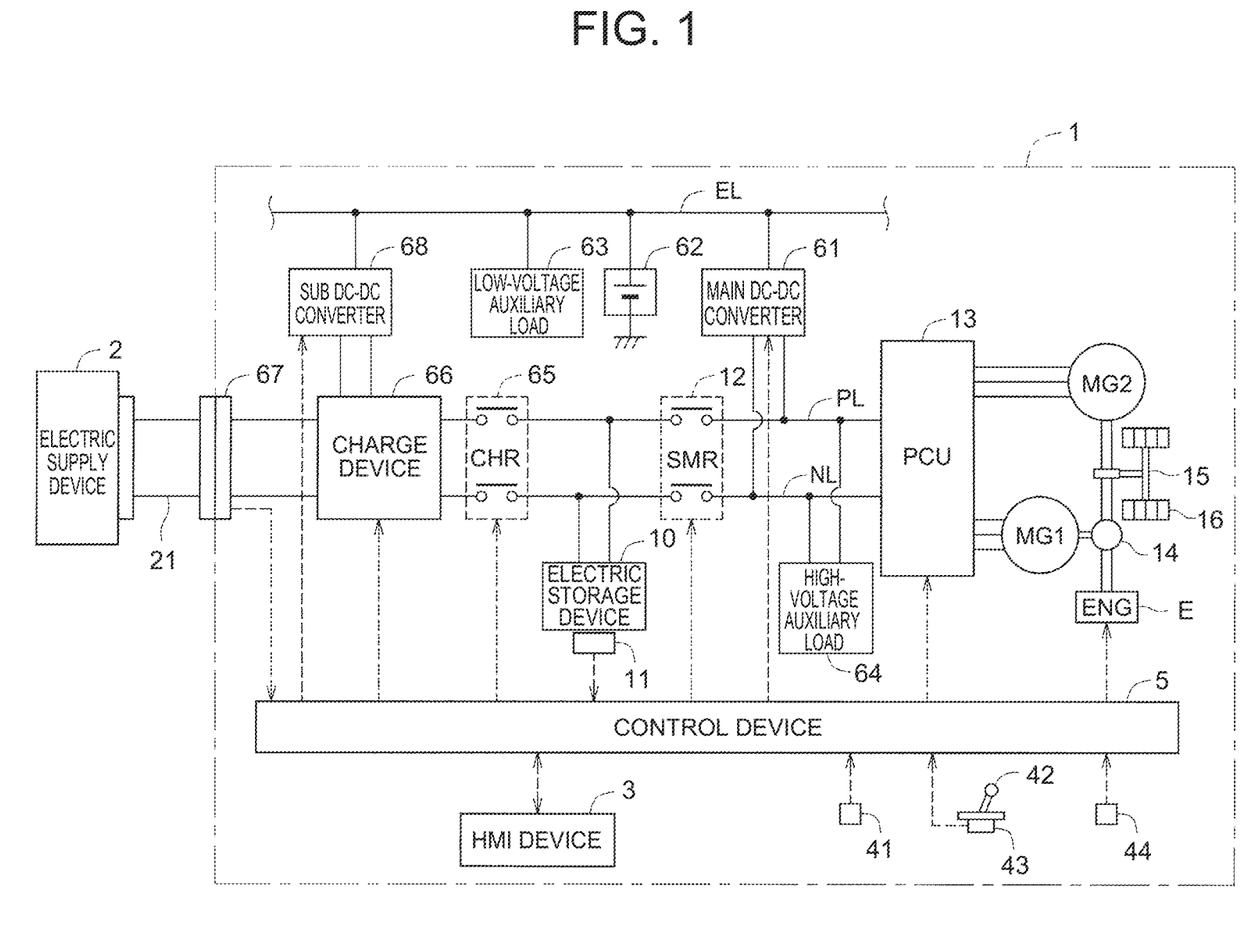
FIG. 1 is a diagram showing a schematic configuration of a plug-in hybrid vehicle according to an embodiment.

FIG. 1 is a diagram showing a schematic configuration of a plug-in hybrid vehicle 1 (referred to as merely a vehicle, hereinafter) according to the embodiment. As shown in FIG. 1, the vehicle 1 can be connected to an electric supply device 2 outside the vehicle 1 through a charge cable 21, and is configured to allow an external charge in which an electric storage device (driving battery) 10 mounted on the vehicle 1 is charged by supply of alternating-current power from the electric supply device 2.

As main constituent elements, the vehicle 1 includes the electric storage device 10, a monitoring unit 11, a system main relay 12 (referred to as an SMR, hereinafter), a power control unit 13 (referred to as a PCU, hereinafter), motor generators MG1, MG2, an engine E, a power split device 14, a drive shaft 15, drive wheels 16, an Human Machine Interface (HMI) device 3, an accelerator pedal sensor 41, a shift lever 42, a shift position sensor 43, a start switch 44, and a control device 5. Furthermore, the vehicle 1 includes a main DC-DC converter 61, an auxiliary battery 62, a low-voltage auxiliary load 63, a high-voltage auxiliary load 64, a charge relay 65, a charge device 66, an inlet 67, and a sub DC-DC converter 68.

The electric storage device 10 is configured to include a plurality of laminated batteries. For example, the battery is a secondary battery such as a nickel-hydrogen battery and a lithium-ion battery. The battery may be a battery that includes a liquid electrolyte between a positive electrode and a negative electrode, or may be a battery (solid-state battery) that includes a solid electrolyte. The electric storage device 10 may be a capacitor having a large capacity.

The monitoring unit 11 monitors the state (voltage, current, temperature and the like) of the electric storage device 10, and outputs the result to the control device 5.

The PCU 13 is configured to control the motor generators MG1, MG2 separately, by performing electric power conversion between the electric storage device 10 and the motor generators MG1, MG2, in response to a control signal from the control device 5. The PCU 13 is configured to include two inverters that correspond to the motor generators MG1, MG2 and a converter that steps up a direct-current voltage supplied to each inverter, to a voltage equal to or higher than an output voltage of the electric storage device 10.

Each of the motor generators MG1, MG2 is an alternating-current rotating electric machine, and is configured by a three-phase alternating-current rotating electric machine, for example. The motor generator MG1 is coupled to a crankshaft of the engine E through the power split device 14. At the time of start of the engine E, the motor generator MG1 rotates the crankshaft of the engine E using the electric power of the electric storage device 10. Further, during traveling of the vehicle 1 and during stop of the vehicle 1, the motor generator MG1 can generate electricity using the dynamic power of the engine E. Alternating-current power generated by the motor generator MG1 is converted into direct-current power by the PCU 13, and is stored in the electric storage device 10. In some cases, the alternating-current power generated by the motor generator MG1 is supplied to the motor generator MG2.

The motor generator MG2 rotates the drive shaft 15 using at least one of the electric power from the electric storage device 10 and the electric power generated by the motor generator MG1. At the time of braking and at the time of decrease in acceleration, the motor generator MG2 can generate electricity by regenerative braking. Alternating-current power generated by the motor generator MG2 is converted into direct-current power by the PCU 13, and is stored in the electric storage device 10.

For example, the engine E is an internal combustion engine such as a gasoline engine and a diesel engine. The engine E is controlled by a control signal from the control device 5.

The power split device 14 is configured by a planetary gear mechanism, for example, and splits the dynamic power generated by the engine E, into dynamic power to be transmitted to the drive wheels 16 and dynamic power to be transmitted to the motor generator MG1.

The HMI device 3 is a device that provides a variety of information relevant to the vehicle 1, to a user, and that accepts a user's operation. The HMI device 3 includes a display, a speaker and others that are provided in a vehicle cabin.

The accelerator pedal sensor 41 detects the operation amount of an accelerator pedal (not illustrated) by the user, and outputs the result to the control device 5.

The shift position sensor 43 detects the position (shift position) of the shift lever 42 that is operated by the user, and outputs the result to the control device 5. The control device 5 selects a shift range corresponding to the shift position, from a plurality of shift ranges including a drive (D) range, a reverse (R) range, a neutral (N) range, a parking (P) range and the like, and sets the selected range as the shift range of the vehicle 1. In the parking (P) range, the rotation of the drive shaft 15 is physically fixed (locked).

The start switch 44 is a manual switch for inputting an operation by which the user sets a control system of the vehicle 1 to one of a Ready-ON state and a Ready-OFF state. For example, when the start switch 44 is pushed while the user is depressing an unillustrated brake pedal, the control system becomes the Ready-ON state, and when the start switch 44 is pushed in the Ready-ON state, the control system becomes the Ready-OFF state. In the Ready-ON state, the actuation of the engine E and the motor generators MG1, MG2 based on an accelerator pedal operation by the user is permitted, and the vehicle 1 can travel. On the other hand, in the Ready-OFF state, the actuation of the engine E and the motor generators MG1, MG2 based on the accelerator pedal operation by the user is prohibited, and the vehicle 1 is prohibited from traveling. The start switch 44 is operated also when a my-room mode described later is set. For example, when the start switch 44 is pushed while the user is not depressing the brake pedal, the control system becomes a state that allows switching to the my-room mode, and the my-room mode can be set by an operation of the HMI device 3. Details of the my-room mode will be described later.

The control device 5 is configured to include a Central Processing Unit (CPU), a memory, and an input-output port (not illustrated) through which various signals are input and output. The control device 5 receives signals from sensors and the like, and outputs control signals to devices to control the devices. The controls of the devices may be implemented and processed by dedicated hardware (electronic circuit), without being limited to processing by software. For example, the control device 5 executes a traveling control of the vehicle 1 by controlling the PCU 13, the engine E, the SMR 12 and the like.

The auxiliary battery 62 is connected to a low-voltage line EL, and stores electric power for actuating the low-voltage auxiliary load 63 that is mounted on the vehicle 1. For example, the auxiliary battery 62 is configured to include a lead storage battery. The voltage of the auxiliary battery 62 is lower than the voltage of the electric storage device 10, and is about 12 V, for example.

The low-voltage auxiliary load 63 is connected to the low-voltage line EL, and is actuated by electric power that is supplied from the low-voltage line EL. For example, the low-voltage auxiliary load 63 includes an electric load such as a lighting device, a wiper device, an audio device, a navigation system, a head light, and an electronic apparatus that is connected to an outlet in the vehicle cabin.

The high-voltage auxiliary load 64 is connected to high-voltage lines PL, NL that link the SMR 12 and the PCU 13, and is actuated by electric power that is supplied from the high-voltage lines PL, NL. For example, the high-voltage auxiliary load 64 includes an electric load such as an air-conditioner.

The main DC-DC converter 61, which is connected between the high-voltage lines PL, NL and the low-voltage line EL, steps down electric power that is supplied from the high-voltage lines PL, NL, and then supplies the electric power to the low-voltage line EL. The main DC-DC converter 61 is controlled by the control device 5. The main DC-DC converter 61 may be built in the PCU 13.

The inlet 67 can be connected to the electric supply device 2 through the charge cable 21. When the charge cable 21 has been connected to the inlet 67, a signal indicating that the charge cable 21 has been connected to the inlet 67 is output from the inlet 67 to the control device 5.

The charge device 66 is connected between the inlet 67 and the charge relay 65. The charge device 66 converts alternating-current power that is supplied from the electric supply device 2 through the charge cable 21 and the inlet 67, into direct-current power, and outputs the direct-current power to the charge relay 65.

The charge relay 65 is electrically connected to the high-voltage lines PL, NL that link the electric storage device 10 and the charge device 66. The charge relay 65 switches an open-close state, in response to a control signal from the control device 5.

The sub DC-DC converter 68, which is connected between the charge device 66 and the low-voltage line EL, steps down electric power that is supplied from the inlet 67, and then supplies the electric power to the low-voltage line EL. The sub DC-DC converter 68 is controlled by the control device 5. The sub DC-DC converter 68 may be built in the charge device 66.

Figure 2:
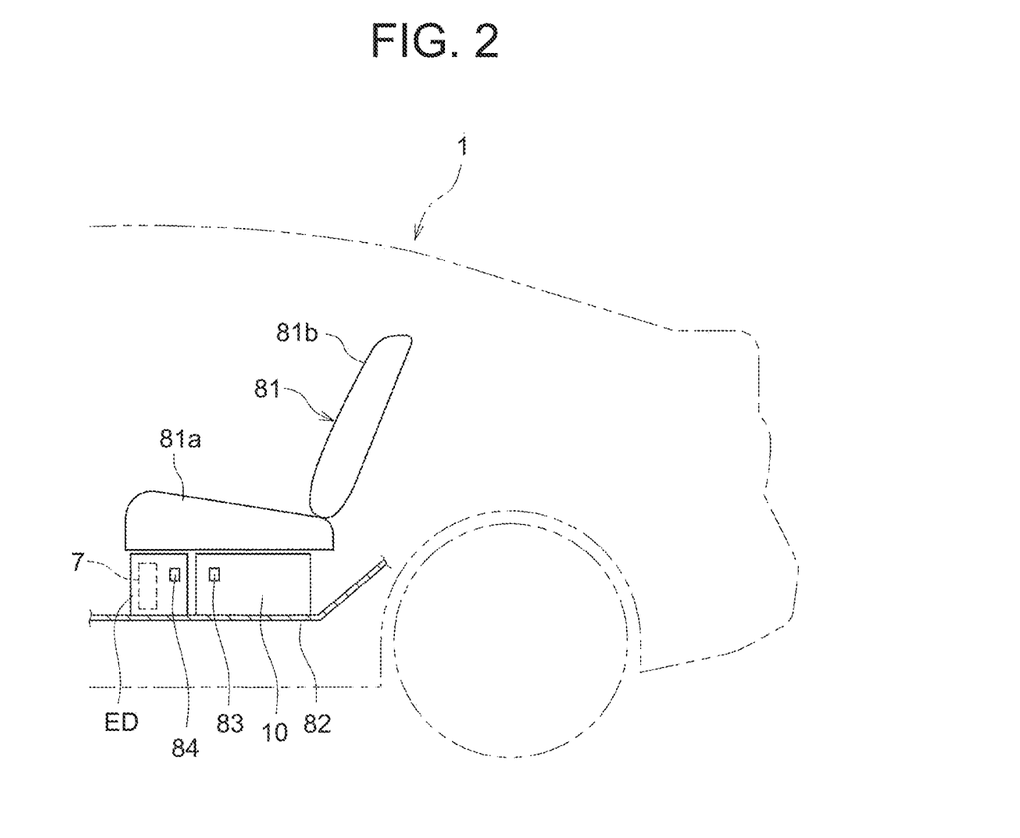
FIG. 2 is a lateral view showing a rear seat of the vehicle and a periphery of the rear seat.

FIG. 2 is a lateral view showing a rear seat 81 of the vehicle 1 and a periphery of the rear seat 81. As shown in FIG. 2, in the vehicle 1 according to the embodiment, the electric storage device (electric component) 10 and an electric item (electronic component) ED are arranged below the rear seat 81. The electric storage device 10 and the electric item ED correspond to the device in the disclosure. Specifically, as the electric item ED that is arranged below the rear seat 81, there are the DC-DC converters 61, 68 and an automatic driving module 7 described later.

The rear seat 81 is fixed to an upper surface of a rear floor panel 82 of the vehicle 1. The rear seat 81 includes a seat portion (seat cushion) 81a and a backrest (seat back) 81b.

The electric storage device 10 and the electric item ED are attached to the upper surface of the rear floor panel 82 below the seat portion 81a of the rear seat 81. As described above, the electric storage device 10 is configured by a secondary battery that allows charge and discharge. The automatic driving module 7 included in the electric item ED is configured by a module of a plurality of electronic components for automatic driving of the vehicle 1, and the plurality of electronic components is contained within a module case. The plurality of electronic components constituting the automatic driving module 7 includes an automatic driving control ECU, a map information ECU and the like. The automatic driving control ECU and the map information ECU are publicly known, and therefore descriptions of the automatic driving control ECU and the map information ECU are omitted. The control of the automatic driving of the vehicle 1 and the control of switching between the automatic driving and manual driving are performed by the automatic driving control ECU.

As a characteristic of the embodiment, an electric storage device temperature sensor 83 (the temperature detector in the disclosure) that detects the temperature of the electric storage device 10 and an electric item temperature sensor 84 (similarly, the temperature detector in the disclosure) that detects the temperature of the electric item ED are provided. For example, the electric storage device temperature sensor 83 is attached to an outer surface of a case of the electric storage device 10. Alternatively, the electric storage device temperature sensor 83 may be arranged within the electric storage device 10. The electric item temperature sensor 84 is attached to a case of the electric item ED. Alternatively, the electric item temperature sensor 84 may be arranged within the electric item ED. For example, each of the temperature sensors 83, 84 is configured by a thermistor. The electric storage device temperature sensor 83 outputs information of the detected temperature of the electric storage device 10, and the electric item temperature sensor 84 outputs information of the detected temperature of the electric item ED.

My-Room Mode

The vehicle 1 according to the embodiment has the my-room mode as a control mode during the stop of the vehicle 1. Specifically, when the user performs a predetermined operation (an operation to set the my-room mode) to the HMI device 3 in a state where the shift range is the parking range, the control device 5 sets the control mode of the vehicle 1 to the my-room mode.

In the my-room mode, the control device 5 prohibits the traveling of the vehicle 1, and permits the actuation of auxiliary devices (the low-voltage auxiliary load 63, the high-voltage auxiliary load 64 and the like). Thereby, in the vehicle cabin, the user can take a break while actuating the air-conditioner, can appreciate music while actuating the audio device, or can use an electronic apparatus (a game machine or the like) brought to the vehicle cabin by the user while the electronic apparatus is connected to the outlet in the vehicle cabin.

The prohibition of the traveling of the vehicle 1 in the my-room mode is realized, for example, by fixing the output of the accelerator pedal sensor 41 to zero regardless of the operation amount of the accelerator pedal and fixing the shift range to the parking range regardless of the position (shift position) of the shift lever 42. Thereby, in the my-room mode, the motor generator MG2 is stopped, and the drive wheels 16 are fixed (locked).

As the my-room mode, the vehicle 1 according to the embodiment has a "my-room charge mode" and a "my-room electricity generation mode". The my-room charge mode and the my-room electricity generation mode will be described below.

My-Room Charge Mode

The my-room charge mode can be set in a state where the electric supply device 2 has been connected to the inlet 67 of the vehicle 1 through the charge cable 21. That is, the my-room charge mode is set when the user performs the operation to set the my-room mode to the HMI device 3 in a state where the signal indicating that the charge cable 21 has been connected to the inlet 67 has been output from the inlet 67 to the control device 5.

In the my-room charge mode, the control device 5 prohibits the traveling of the vehicle 1 as described above, and permits the actuation of auxiliary devices (the low-voltage auxiliary load 63, the high-voltage auxiliary load 64 and the like), while the external charge is executed using the electric power received by the inlet 67 from the electric supply device 2.

Specifically, in the my-room charge mode, the control device 5 closes the charge relay 65, and actuates the charge device 66 and the sub DC-DC converter 68 as necessary. Thereby, the electric storage device 10 is charged with the electric power received by the inlet 67 from the electric supply device 2, and part of the electric power received by the inlet 67 from the electric supply device 2 is supplied from the sub DC-DC converter 68 to the low-voltage auxiliary load 63 through the low-voltage line EL.

When the high-voltage auxiliary load 64 is actuated in the my-room charge mode (for example, when the air-conditioner is actuated), the control device 5 further closes the SMR 12. Thereby, part of the electric power received by the inlet 67 from the electric supply device 2 is supplied to the high-voltage auxiliary load 64 through the SMR 12 and the high-voltage lines PL, NL. When the consumed power of the low-voltage auxiliary load 63 exceeds the capacity (maximum output power) of the sub DC-DC converter 68 in the my-room charge mode, the control device 5 closes the SMR 12, and actuates the main DC-DC converter 61. Thereby, electric power for the actuation of the low-voltage auxiliary load 63 is secured.

My-Room Electricity Generation Mode

The my-room charge mode can be set only in the state where the electric supply device 2 has been connected to the vehicle 1. On the other hand, in the my-room electricity generation mode, the motor generator MG1 generates electricity using the dynamic power of the engine E, during the stop of the vehicle 1. That is, the my-room electricity generation mode can be set in a state where the electric supply device 2 has not been connected to the vehicle 1. The my-room electricity generation mode is set when the user performs the operation to set the my-room mode to the HMI device 3 in a state where the signal indicating that the charge cable 21 has been connected to the inlet 67 has not been output from the inlet 67 to the control device 5.

In the my-room electricity generation mode, the control device 5 prohibits the traveling of the vehicle 1 as described above, and permits the actuation of auxiliary devices (the low-voltage auxiliary load 63, the high-voltage auxiliary load 64 and the like) with the electric power generated by the motor generator MG1 using the dynamic power of the engine E.

Specifically, in the my-room electricity generation mode, the control device 5 closes the SMR 12, and actuates the main DC-DC converter 61 as necessary. Thereby, the electric power stored in the electric storage device 10 is supplied to the high-voltage auxiliary load 64, and is supplied from the main DC-DC converter 61 to the low-voltage auxiliary load 63 through the low-voltage line EL.

In the my-room electricity generation mode, when the electric storage amount of the electric storage device 10 is larger than a predetermined threshold value, the control device 5 stops the electricity generation (referred to as "engine electricity generation", hereinafter) by the motor generator MG1 using the dynamic power of the engine E. That is, the engine E, the PCU 13 and the motor generator MG1 are stopped.

On the other hand, in the my-room electricity generation mode, when the electricity storage amount of the electric storage device 10 is smaller than the predetermined threshold value, the control device 5 performs the engine electricity generation. That is, the control device 5 performs the engine electricity generation by actuating the engine E, and controls the engine E, the PCU 13 and the motor generator MG1 such that the electric power obtained by the engine electricity generation is supplied to the high-voltage lines PL, NL. Thereby, the electric power obtained by the engine electricity generation is supplied to the high-voltage auxiliary load 64 through the high-voltage lines PL, NL, and is supplied to the low-voltage auxiliary load 63 through the high-voltage lines PL, NL, the main DC-DC converter 61 and the low-voltage line EL. Thereby, electric power for the actuation of the low-voltage auxiliary load 63 and the high-voltage auxiliary load 64 is secured.

Further, the electric power obtained by the engine electricity generation is supplied to the electric storage device 10 through the high-voltage lines PL, NL and the SMR 12, so that the electric storage device 10 is charged. Then, when the electric storage amount of the electric storage device 10 becomes larger than the predetermined threshold value, the control device 5 stops the engine electricity generation.

Schematic Configuration of Air-Conditioner

Figure 3:
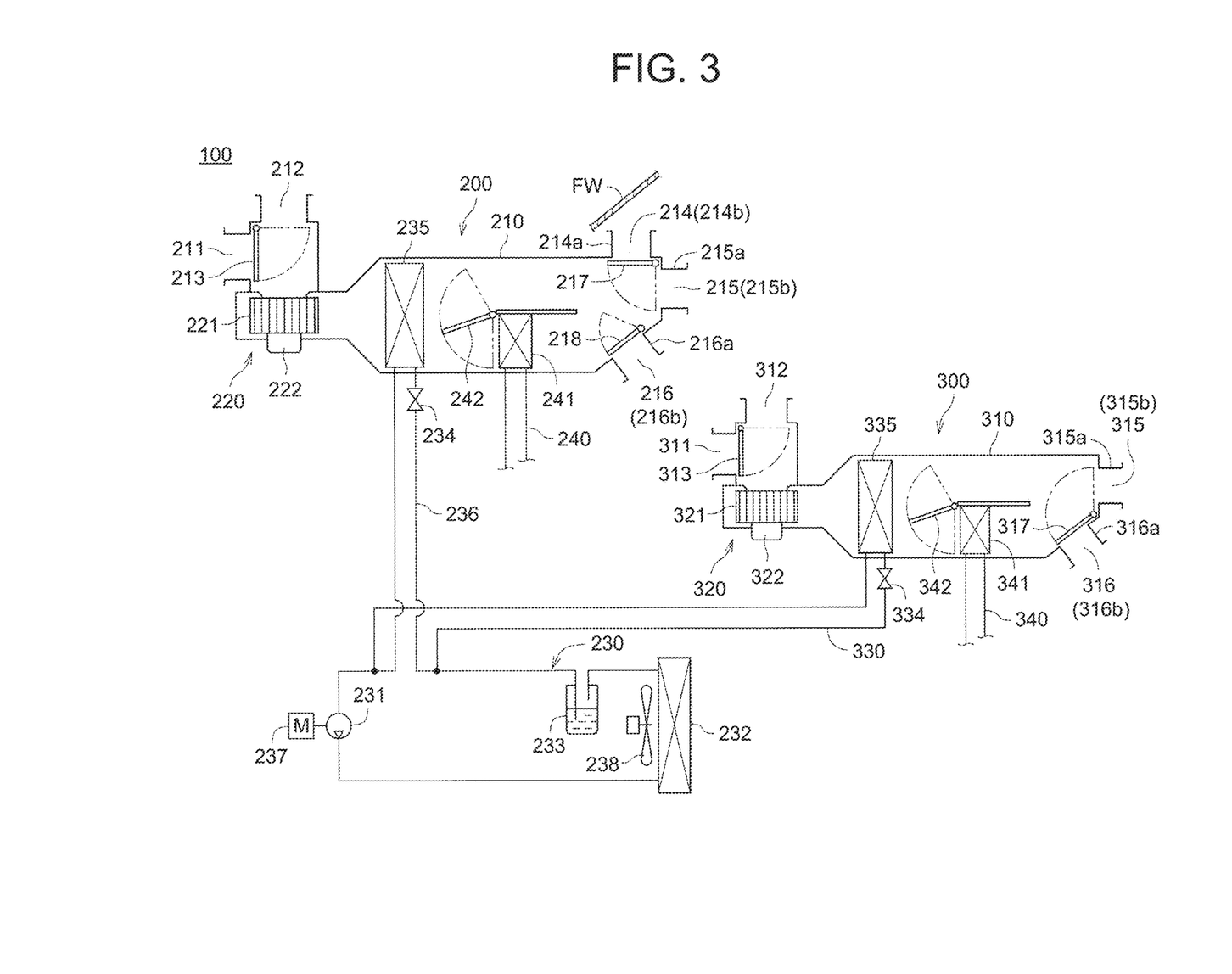
FIG. 3 is a diagram showing a schematic configuration of an air-conditioner that is mounted on the vehicle.

Next, a schematic configuration of an air-conditioner 100 mounted on the vehicle 1 will be described. FIG. 3 is a diagram showing the schematic configuration of the air-conditioner 100 mounted on the vehicle 1.

As shown in FIG. 3, the air-conditioner 100 mounted on the vehicle 1 includes a front air-conditioning unit 200 that blows air-conditioning wind toward a front seat and a rear air-conditioning unit 300 that blows the air-conditioning wind toward the rear seat 81.

Front Air-Conditioning Unit

As shown in FIG. 3, the front air-conditioning unit 200 includes an air-conditioning duct 210 that forms an air passage for leading air-conditioning air (air-conditioning wind) into the vehicle cabin (toward the front seat), a centrifugal air blowing machine (air-conditioning air blowing machine) 220 that generates air flow in the air-conditioning duct 210, a refrigerant circulation circuit 230 that cools air flowing in the air-conditioning duct 210, a coolant circuit 240 that heats the air flowing in the air-conditioning duct 210 (FIG. 3 shows only a part of the coolant circuit 240), and the like.

An uppermost stream side (upwind side) of the air-conditioning duct 210 is a portion that configures a suction port switching box (internal-external-air switching box), and includes an internal-air suction port 211 that takes air (internal air) in the interior of the vehicle cabin and an external-air suction port 212 that takes air (external) in the exterior of the vehicle cabin.

Furthermore, on the inside of the internal-air suction port 211 and the external-air suction port 212, an internal-external-air switching door 213 is pivotally attached. The internal-external-air switching door 213 is driven by an actuator 213a (see FIG. 4) such as a servomotor, and switches a suction port mode between an internal-air circulation mode and an external-air introduction mode.

A downmost stream side (downwind side) of the air-conditioning duct 210 is a portion that configures a blowing port switching box, and includes a defroster (DEF) opening portion 214, a face (FACE) opening portion 215 and a foot (FOOT) opening portion 216. In addition, although not illustrated, side opening portions are provided on both sides in a vehicle-width direction.

In the DEF opening portion 214, a DEF duct 214a is provided, and at a downmost stream end of the DEF duct 214a, a DEF blowing port 214b is formed. The DEF blowing port 214b blows the air-conditioning air toward an inner surface of a front windshield FW of the vehicle 1.

In the FACE opening portion 215, a FACE duct 215a is provided, and at a downmost stream end of the FACE duct 215a, a FACE blowing port 215b is formed. The FACE blowing port 215b blows the air-conditioning air toward the head and chest of the occupant.

In the FOOT opening portion 216, a FOOT duct 216a is provided, and at a downmost stream end of the FOOT duct 216a, a FOOT blowing port 216b is formed. The FOOT blowing port 216b blows the air-conditioning air toward the feet of the occupant.

Moreover, on the inside of the blowing ports 214b, 215b, 216b, blowing port switching doors 217, 218 are pivotally attached. The blowing port switching doors 217, 218 are driven by actuators 217a, 218a (see FIG. 4) such as servomotors, and switch a blowing port mode to one of a FACE mode, a BI-LEVEL (B/L) mode, a FOOT mode, a FOOT-DEF (F/D) mode and a DEF mode.

The centrifugal air blowing machine 220 includes a blower 221 that is rotatably contained in a scroll case formed integrally with the air-conditioning duct 210, and a blower motor 222 that rotates and drives the blower 221.

Figure 4:
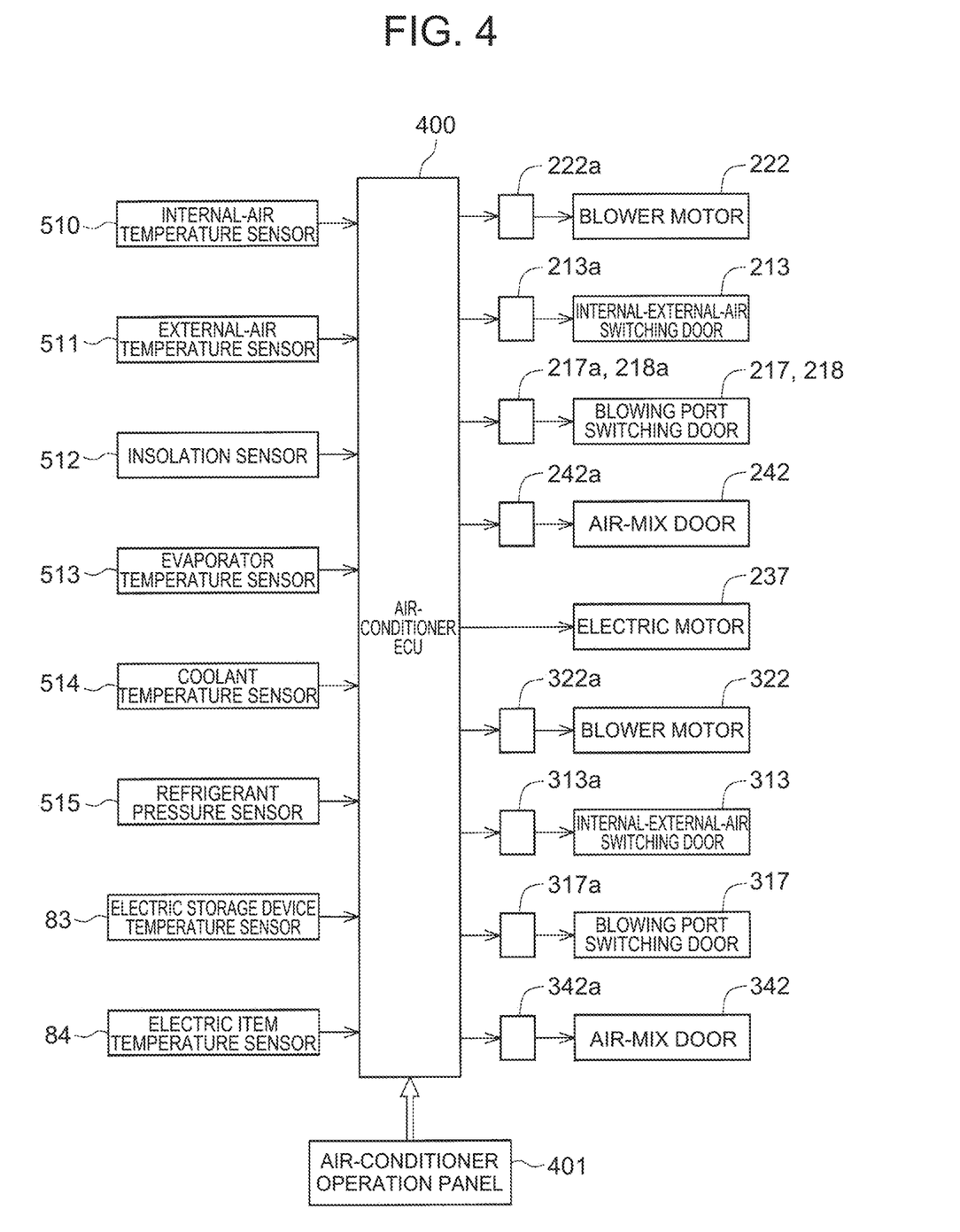
FIG. 4 is a block diagram showing a configuration of a control system of the air-conditioner.

Moreover, in the blower motor 222, a blower wind volume (the rotation speed of the blower 221) is controlled based on a blower terminal voltage that is applied through a blower drive circuit 222a (see FIG. 4).

The refrigerant circulation circuit 230 is constituted by a compressor 231, a condenser 232 into which a refrigerant discharged from a discharge port of the compressor 231 flows, a receiver 233 that performs gas-liquid separation of the condensed refrigerant and causes only the liquid refrigerant to flow downstream, an expansion valve 234 that depressurizes and expands the liquid refrigerant, an evaporator 235 that evaporates the depressurized and expanded refrigerant, a refrigerant pipe 236 that circularly connects the compressor 231, the condenser 232, the receiver 233, the expansion valve 234 and the evaporator 235, and the like.

At a portion of the air passage in the longitudinal direction of the air passage, the evaporator 235 is arranged over the whole of the air passage.

The compressor 231 compresses and discharges the sucked refrigerant, and is configured as an electric compressor that is driven by an electric motor 237. The electric motor 237 is an alternating-current motor, and the actuation (rotation speed) of the electric motor 237 is controlled by alternating-current voltage that is output from an unillustrated inverter. Dynamic power due to the actuation of the electric motor 237 is transmitted to the compressor 231. Thereby, the refrigerant is circulated through the refrigerant circulation circuit 230, and the air is cooled due to the evaporation of the refrigerant in the evaporator 235. When the electric motor 237 is stopped, the compressor 231 is also stopped, so that the refrigerant is not circulated through the refrigerant circulation circuit 230.

The condenser 232 condenses the refrigerant compressed by the compressor 231. Specifically, the condenser 232 condenses the refrigerant by performing heat exchange of the external air sent by a cooling fan 238, traveling wind (when the vehicle 1 is traveling), and the refrigerant.

The coolant circuit 240 is a circuit through which coolant warmed in a water jacket of the engine E is circulated by an unillustrated water pump, and includes a heater core 241.

Within the heater core 241, engine coolant flows, and the heater core 241 heats the air using the engine coolant as a heat source for heating. In addition to the heater core 241, the coolant circuit 240 includes a radiator that radiates the heat of the engine coolant to the atmosphere, and a thermostat that switches a circulation route of the coolant (the radiator and the thermostat are not illustrated). Configurations of the radiator and the thermostat are well known, and therefore descriptions of the configurations are omitted.

The heater core 241 is arranged at a portion of the air passage on the downstream side of the evaporator 235 (for example, a lower half of a portion of the air passage in the longitudinal direction of the air passage).

On the upstream side of the heater core 241, an air-mix (A/M) door 242 is pivotally attached. The air-mix door 242 is driven by an actuator 242a (see FIG. 4) such as a servomotor. The air-mix door 242 adjusts the temperature of the air to be blown into the vehicle cabin, by changing the ratio between the amount of air that passes through the heater core 241 and the amount of air that bypasses the heater core 241, depending on a stop position from a MAX-COOL position that causes all amount of air to bypass the heater core 241 to a MAX-HOT position that causes all amount of air to pass through the heater core 241.

Rear Air-Conditioning Unit

Next, the rear air-conditioning unit 300 will be described. As shown in FIG. 3, the rear air-conditioning unit 300 includes an air-conditioning duct 310 that forms an air passage for leading the air-conditioning air toward the rear seat 81, a centrifugal air blowing machine 320 that generates air flow in the air-conditioning duct 310, an expansion valve 334 and an evaporator 335 that are included in a refrigerant pipe 330 connected to the refrigerant circulation circuit 230, a heater core 341 that is included in a coolant pipe 340 connected to the coolant circuit 240, and the like.

Similarly to the above-described front air-conditioning unit 200, an internal-air suction port 311 and an external-air suction port 312 are provided on an uppermost stream side of the air-conditioning duct 310. On the inside of the internal-air suction port 311 and the external-air suction port 312, an internal-external-air switching door 313 is pivotally attached, and a suction port mode can be switched between an internal-air circulation mode and an external-air introduction mode, by drive of an actuator 313a (see FIG. 4).

On a downmost stream side of the air-conditioning duct 310, a FACE opening portion 315 and a FOOT opening portion 316 are provided. In addition, although not illustrated, side opening portions are provided on both sides in the vehicle-width direction.

In the FACE opening portion 315, a FACE duct 315a is provided, and at a downmost stream end of the FACE duct 315a, a FACE blowing port 315b is formed. The FACE blowing port 315b blows the air-conditioning air toward the head and chest of the occupant that sits on the rear seat 81.

In the FOOT opening portion 316, a FOOT duct 316a is provided, and at a downmost stream end of the FOOT duct 316a, a FOOT blowing port 316b is formed. The FOOT blowing port 316b blows the air-conditioning air toward the feet of the occupant that sits on the rear seat 81.

Moreover, on the inside of the blowing ports 315b, 316b, a blowing port switching door 317 is pivotally attached. The blowing port switching door 317 is driven by an actuator 317a (see FIG. 4), and switches a blowing port mode to one of the FACE mode and the FOOT mode.

The centrifugal air blowing machine 320 includes a blower 321 and a blower motor 322. In the blower motor 322, a blower wind volume (the rotation speed of the blower 321) is controlled based on a blower terminal voltage that is applied through a bower drive circuit 322a (see FIG. 4).

The expansion valve 334 and the evaporator 335 that are included in the refrigerant pipe 330 perform the same actions as the expansion valve 234 and the evaporator 235 that are included in the front air-conditioning unit 200. When an air-conditioning action (supply of cool wind to the rear seat 81) of the rear air-conditioning unit 300 is performed, the expansion valve 334 is adjusted at a predetermined opening degree. On the other hand, when the air-conditioning action of the rear air-conditioning unit 300 is not performed, the expansion valve 334 is fully closed.

Within the heater core 341 that is included in the coolant pipe 340, the engine coolant flows, and the heater core 341 heats the air using the engine coolant as a heat source for heating.

On the upstream side of the heater core 341, an air-mix (A/M) door 342 is pivotally attached. The air-mix door 342 is driven by an actuator 342a (see FIG. 4). The air-mix door 342 adjusts the temperature of the air to be blown toward the rear seat 81, by changing the ratio between the amount of air that passes through the heater core 341 and the amount of air that bypasses the heater core 341 while pivoting between a MAX-COOL position and a MAX-HOT position.

Air-Conditioner ECU

As shown in FIG. 4, the air-conditioner ECU 400 controls the compressors 231 (electric motor 237), the actuators 213a, 217a, 218a, 242a, 313a, 317a, 342a, and the like, in response to a request for air-conditioning in the vehicle cabin. Although not illustrated, the air-conditioner ECU 400 is a generally known Electronic Control Unit (ECU), and includes a Central Processing Unit (CPU), a Read Only Memory (ROM), a Random Access Memory RAM (RAM), a backup RAM and the like.

In the ROM, various control programs, a map that is referred to for execution of the various control programs, and the like are stored. The CPU executes computation processing based on the various control programs and map stored in the ROM. The RAM is a memory in which computation results of the CPU, data input from sensors, and the like are temporarily stored, and the backup RAM is a nonvolatile memory in which data that should be saved at the time of stop of the engine E and the like are stored.

As shown in FIG. 4, the air-conditioner ECU 400 receives switch signals from various switches on an air-conditioner operation panel 401 and sensor signals from various sensors. The air-conditioner operation panel 401 is displayed on a display (HMI device 3) provided on a front surface (instrument panel) in the vehicle cabin.

The various switches provided on the air-conditioner operation panel 401 include an automation (AUTO) switch for automatically controlling the air-conditioning units 200, 300, an air-conditioner (A/C) switch for forcibly actuating the compressor 231, a suction port switching switch for switching the suction port mode, a temperature setting switch for setting the temperature in the vehicle cabin to a desired temperature, a wind volume switching switch for setting the wind volumes of the blowers 221, 321 in a manual mode, a blowing port switching switch for switching the blowing port mode, and the like.

The various sensors connected to the air-conditioner ECU 400 include an internal-air temperature sensor 510 that detects the temperature of the air in the interior of the vehicle cabin, an external-air temperature sensor 511 that detects the temperature of the air in the exterior of the vehicle cabin, an insolation sensor 512 that detects the amount of insolation in the interior of the vehicle cabin, an evaporator temperature sensor 513 that detects the temperatures of the evaporators 235, 335, a coolant temperature sensor 514 that detects the temperature of the engine coolant that flows into the heater cores 241, 341, a refrigerant pressure sensor 515 that detects the high pressure (discharge pressure) of the refrigerant circulation circuit 230, and the like.

Further, the air-conditioner ECU 400 receives temperature detection signals from the electric storage device temperature sensor 83 and the electric item temperature sensor 84. That is, the air-conditioner ECU 400 receives information of the temperature of the electric storage device 10 that is detected by the electric storage device temperature sensor 83 and information of the temperature of the electric item ED that is detected by the electric item temperature sensor 84.

The air-conditioner ECU 400 is connected to the electric motor 237, the actuators 213a, 217a, 218a, 242a, 313a, 317a, 342a, and the blower drive circuits 222a, 322a, and controls the electric motor 237, the actuators 213a, 217a, 218a, 242a, 313a, 317a, 342a, and the blower drive circuits 222a, 322a, in response to the request for air-conditioning in the vehicle cabin.

Characteristic of Embodiment

As described above, the vehicle air-conditioner in the related art (Japanese Patent Application Publication No. 2003-252023) detects the temperature distribution on the surface of the interior item such as the seat in the vehicle cabin or the surface of the occupant that sits on the seat, and performs the air-conditioning control (for example, the change in the blowing direction of the air-conditioning wind) depending on the detected temperature. Therefore, before the temperature of the surface of the interior item or the surface of the occupant becomes high, the blowing direction of the air-conditioning wind is not changed. As a result, it takes time before the occupant feels comfortable after the blowing direction of the air-conditioning wind is changed, and there is room for improvement in increase in comfortableness in the vehicle cabin.

In view of this point, in the embodiment, the temperature of the electric storage device 10 arranged below the rear seat 81 that is the interior item in the vehicle cabin is detected by the electric storage device temperature sensor 83, and also the temperature of the electric item ED arranged below the rear seat 81 is detected by the electric item temperature sensor 84 (the temperatures of the devices are detected). When at least one of the detected temperatures exceeds a predetermined temperature, an air-conditioning switching action for restraining the surrounding temperature of the rear seat 81 from becoming high is performed. As the air-conditioning switching action, specifically, the suction port mode of the rear air-conditioning unit 300 is set to the external-air introduction mode, the blowing mode is set to the FACE mode, and air-conditioning performance of the rear air-conditioning unit 300 is increased. That is, when the suction port mode of the rear air-conditioning unit 300 is in the internal-air circulation mode, the suction port mode is switched to the external-air introduction mode, and when the blowing mode is a mode (for example, the FOOT mode) other than the FACE mode, the blowing mode is switched to the FACE mode. Herein, the increase in the air-conditioning performance of the rear air-conditioning unit 300 includes blowing wind by starting the actuation of the rear air-conditioning unit 300 in the stop state (actuating the centrifugal air blowing machine 320 without circulating the refrigerant through the refrigerant pipe 330 of the rear air-conditioning unit 300), supplying cool wind by starting the actuation of the rear air-conditioning unit 300 in the stop state (actuating the centrifugal air blowing machine 320 while circulating the refrigerant through the refrigerant pipe 330 of the rear air-conditioning unit 300), switching the supply by the rear air-conditioning unit 300 from the wind to the cool wind (generating the cool wind by circulating the refrigerant through the refrigerant pipe 330), and the like.

Figure 5:
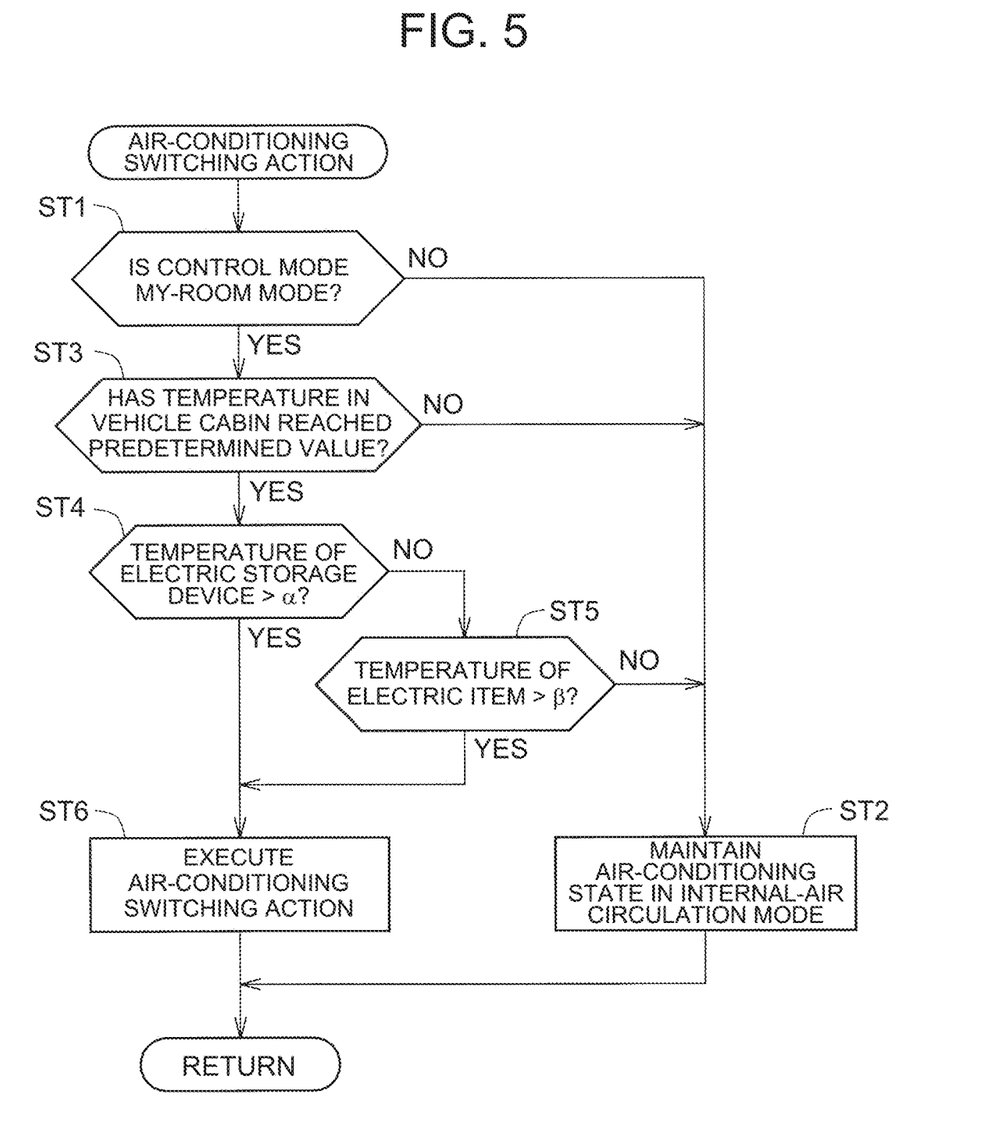
FIG. 5 is a flowchart showing a procedure of an air-conditioning switching action.

The air-conditioning switching action will be described below with reference to a flowchart in FIG. 5. The flowchart is repeatedly executed whenever a previously decided condition is satisfied (for example, with a predetermined period). The flowchart shows an example in which the air-conditioner 100 is switched from a state of the air-conditioning operation in the internal-air circulation mode to the air-conditioning switching action. The state of the air-conditioning operation in the internal-air circulation mode includes both a state where the front air-conditioning unit 200 performs the air-conditioning operation (for example, a cooling operation) in the internal-air circulation mode and where the rear air-conditioning unit 300 is in the stop state and a state where the front air-conditioning unit 200 performs the air-conditioning operation (for example, the cooling operation) in the internal-air circulation mode and where the rear air-conditioning unit 300 performs a wind blowing operation in the internal-air circulation mode.

First, in step ST1, it is determined whether the vehicle is in the stop state and whether the control mode is the my-room mode. Herein, the my-room mode includes both the my-room charge mode and the my-rom electricity generation mode. That is, in both of the case where the control mode is the my-room charge mode and the case where the control mode is the my-room electricity generation mode, the YES determination is made in step ST1.

In the case where the control mode is not the my-room mode and the NO determination is made in step ST1, the procedure transitions to step ST2, and the current air-conditioning state (the air-conditioning operation in the internal-air circulation mode) is maintained.

On the other hand, in the case where the control mode is the my-room mode and the YES determination is made in step ST1, the procedure transitions to step ST3, and it is determined whether the current temperature in the vehicle cabin has reached a predetermined value. The temperature in the vehicle cabin is detected by the internal-air temperature sensor 510. Herein, "the current temperature in the vehicle cabin has reached a predetermined value" means that the current temperature in the vehicle cabin has reached a temperature equal to or lower than a target temperature in the vehicle cabin during the cooling operation in the vehicle cabin, and means that the current temperature in the vehicle cabin has reached a temperature equal to or higher than a target temperature in the vehicle cabin during a heating operation in the vehicle cabin. That is, step ST3 is a step in which the temperature in the vehicle cabin has reached a temperature that is a proper temperature corresponding to a cooling request or a heating request and that allows the comfortableness in the vehicle cabin to be secured.

In the case where the current temperature in the vehicle cabin has not yet reached the predetermined value and the NO determination is made in step ST3, the procedure transitions to step ST2, and the current air-conditioning state (the air-conditioning operation in the internal-air circulation mode) is maintained. That is, the current air-conditioning state is maintained such that the temperature in the vehicle cabin becomes the proper temperature corresponding to the cooling request or the heating request.

On the other hand, in the case where the current temperature in the vehicle cabin has reached the predetermined value and the YES determination is made in step ST3, the procedure transitions to step ST4. Then, the information of the temperature of the electric storage device (the electric storage device arranged below the rear seat 81) 10 that is detected by the electric storage device temperature sensor 83 is acquired, and it is determined whether the temperature of the electric storage device 10 has exceeded a predetermined value $\alpha$.

In the case where the temperature of the electric storage device 10 has exceeded the predetermined value $\alpha$ and the YES determination is made in step ST4, the procedure transitions to step ST6, and the above air-conditioning switching action is executed. That is, the suction port mode of the rear air-conditioning unit 300 is set to the external-air introduction mode, the blowing mode is set to the FACE mode, and the air-conditioning performance of the rear air-conditioning unit 300 is increased. As the control to increase the air-conditioning performance of the rear air-conditioning unit 300 in this case, as described above, in the case where the rear air-conditioning unit 300 is in the stop state, the wind may be blown by starting the actuation of the rear air-conditioning unit 300 (actuating the centrifugal air blowing machine 320 without circulating the refrigerant through the refrigerant pipe 330 of the rear air-conditioning unit 300), and the cool wind may be supplied by starting the actuation of the rear air-conditioning unit 300 (actuating the centrifugal air blowing machine 320 while circulating the refrigerant through the refrigerant pipe 330 of the rear air-conditioning unit 300). In the case where the rear air-conditioning unit 300 is blowing the wind, the rear air-conditioning unit 300 is switched to the supply of the cool wind (the cool wind is generated by circulating the refrigerant through the refrigerant pipe 330).

As for the switching of the rear air-conditioning unit 300 to the supply of the cool wind, during the heating operation in the vehicle cabin, the temperature of the external air is low. Therefore, if the comfortableness in the vehicle cabin can be secured by setting the suction port mode to the external-air introduction mode and introducing the external air (the external air having a low temperature) into the vehicle cabin, it is not necessary to switch the rear air-conditioning unit 300 to the supply of the cool wind (to switch the rear air-conditioning unit 300 to the state of generating the cool wind by circulating the refrigerant through the refrigerant pipe 330). For example, if a target blowing temperature (a target blowing temperature that is previously set for securing the comfortableness in the vehicle cabin) of the rear air-conditioning unit 300 can be achieved only by introducing the external air, it is not necessary to switch the rear air-conditioning unit 300 to the supply of the cool wind.

On the other hand, in the case where the temperature of the electric storage device 10 has not exceeded the predetermined value $\alpha$ and the NO determination is made in step ST4, the procedure transitions to step ST5. Then, the information of the temperature of the electric item (the electric item arranged below the rear seat 81) ED that is detected by the electric item temperature sensor 84 is acquired, and it is determined whether the temperature of the electric item ED has exceeded a predetermined value $\beta$.

In the case where the temperature of the electric item ED has exceeded the predetermined value $\beta$ and the YES determination is made in step ST5, the procedure transitions to step ST6, and the above air-conditioning switching action is executed. That is, as described above, the suction port mode of the rear air-conditioning unit 300 is set to the external-air introduction mode, the blowing mode is set to the FACE mode, and the air-conditioning performance of the rear air-conditioning unit 300 is increased.

The predetermined values (thresholds) $\alpha$, $\beta$ for the determinations in step ST4 and step ST5 may be identical or different between the electric storage device 10 and the electric item ED. In the case of different values, the threshold value for the electric item ED is set to a value higher than the threshold value for the electric storage device 10.

In the case where the temperature of the electric item ED has not exceeded the predetermined value $\beta$ and the NO determination is made in step ST5 (in the case where neither the temperature of the electric storage device 10 nor the temperature of the electric item ED has exceeded the predetermined value), the procedure transitions to step ST2, and the current air-conditioning state (the air-conditioning operation in the internal-air circulation mode) is maintained. That is, the current air-conditioning state is maintained such that the temperature in the vehicle cabin becomes the proper temperature corresponding to the cooling request or the heating request.

In the case where both the temperature of the electric storage device 10 and the temperature of the electric item ED have fallen below the predetermined value after the start of the air-conditioning switching action, the NO determination is made in both step ST4 and step ST5, and the procedure transitions to step ST2, and the air-conditioning state is returned to the air-conditioning operation in the internal-air circulation mode. The above action is repeated.

Effects of Embodiment

As described above, in the embodiment, when the temperature of the electric storage device 10 or electric item ED arranged below the rear seat 81 exceeds the predetermined value, the ventilation of the vehicle cabin is performed by the air-conditioning switching action by which the suction port mode of the rear air-conditioning unit 300 is set to the external-air introduction mode. Thereby, before the surrounding temperature of the occupant that sits on the rear seat 81 significantly rises due to the heat generated by the electric storage device 10 or the electric item ED and the occupant feels uncomfortable, by restraining the surrounding temperature from rising through the external-air introduction to avoid a situation in which the occupant feels uncomfortable, it is possible to maintain the comfortableness in the vehicle cabin.

Furthermore, in the embodiment, as the air-conditioning switching action, the blowing mode is set to the FACE mode. Thereby, by the air-conditioning switching action, the external air for the ventilation is blown toward the occupant (particularly, toward an upper body of the occupant) that sits on the rear seat 81. Therefore, it is possible to surely avoid the occupant feeling uncomfortable as a result of a significant rise in the surrounding temperature of the occupant due to the heat generated by the electric storage device 10 or the electric item ED, and it is possible to contribute to the maintenance of the comfortableness in the vehicle cabin. Further, generally, the FACE mode is a blowing mode in which pressure loss in the air-conditioning duct 310 is smaller and wind volume is larger than in other blowing modes. Also for this reason, it is possible to contribute to the maintenance of the comfortableness in the vehicle cabin, by setting the FACE mode.

Particularly, in the embodiment, the air-conditioning switching action is performed with the condition that at least one of the temperature of the electric storage device 10 and the temperature of the electric item ED exceeds the predetermined value, when the control mode is the my-room mode. In the my-room mode, the generated heat amount of the electric storage device 10 tends to become large due to the charge, and the generated heat amount of the electric item ED (particularly, the DC-DC converters 61, 68, and the like) tends to become large due to the use of the electronic apparatus. That is, there is a high possibility that the surrounding temperature of the occupant that sits on the rear seat 81 significantly rises and the occupant feels uncomfortable. In the embodiment, during the my-room mode, the air-conditioning switching action is executed when the predetermined condition (at least one of the temperature of the electric storage device 10 and the temperature of the electric item ED exceeds the predetermined value) is satisfied. Thereby, it is possible to maintain high comfortableness in the vehicle cabin in the my-room mode (the my-room charge mode or the my-room electricity generation mode), and it is possible to improve the practicality of the my-room mode.

Further, in the embodiment, the suction port mode is set to the internal-air circulation mode until the temperature in the vehicle cabin reaches the predetermined temperature during the air-conditioning operation in the vehicle cabin, and the air-conditioning switching action is performed when at least one of the temperature of the electric storage device 10 and the temperature of the electric item ED exceeds the predetermined value in the state where the temperature in the vehicle cabin has reached the predetermined temperature during the air-conditioning operation in the vehicle cabin. In the external-air introduction mode, the air-conditioning wind is generated by adjusting the temperature of the introduced external air (for example, by cooling the external air having a high temperature to a target temperature), and is blown into the vehicle cabin. Thereby, in the external-air introduction mode, air-conditioning load is higher than in the internal-air circulation mode. In the embodiment, the suction port mode is set to the internal-air circulation mode until the temperature in the vehicle cabin reaches the predetermined temperature during the air-conditioning operation in the vehicle cabin, that is, until the temperature in the vehicle cabin reaches the temperature that allows the comfortableness in the vehicle cabin to be secured, and the air-conditioning switching action is performed when the temperature of the electric storage device 10 or the temperature of the electric item ED exceeds the predetermined value in the state where the temperature in the vehicle cabin has reached the predetermined temperature. Therefore, it is possible to achieve both the securement of the comfortableness in the vehicle cabin and the enhancement in energy efficiency by keeping the air-conditioning load as low as possible.

Modification

Next, a modification will be described. In the above embodiment, the example in which the control mode of the vehicle 1 is the my-room mode has been described. That is, the air-conditioning switching action in the state where the traveling of the vehicle 1 is prohibited has been described. In the modification, an air-conditioning switching action when the control system of the vehicle 1 is in the Ready-ON state due to pushing of the start switch 44 by the user (for example, the user pushes the start switch 44 while depressing the brake pedal) will be described. Other configurations and other control actions are the same as the configurations and control actions in the above embodiment, and therefore only differences from the above embodiment will be described. In the modification, as electricity generation for charging the electric storage device 10 and electricity generation for supplying electricity to the electronic apparatus, there are electricity generation using the dynamic power from the engine E (electricity generation by the motor generator MG1) and electricity generation by regenerative braking (electricity generation by the motor generator MG2).

Figure 6:
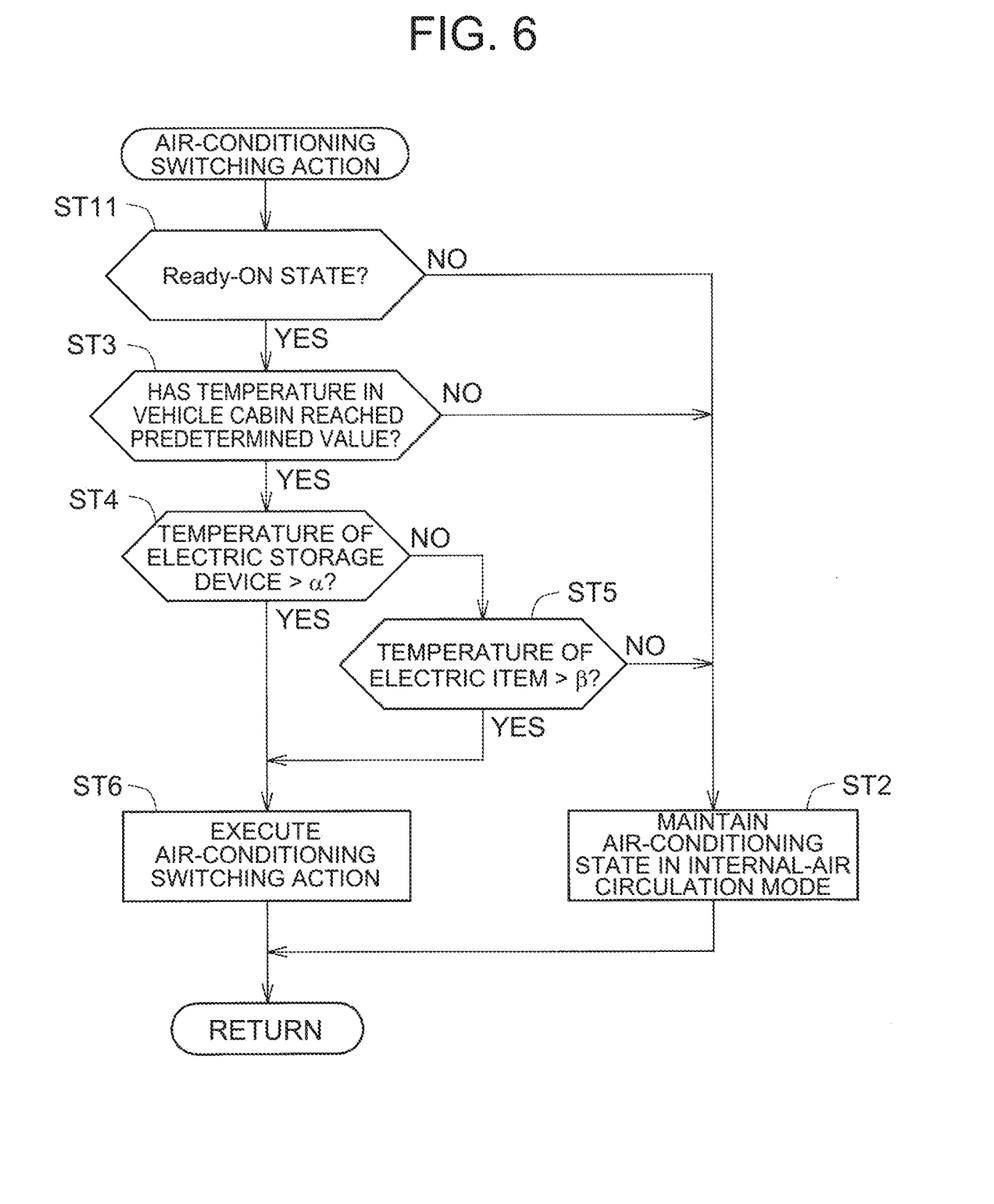
FIG. 6 is a flowchart showing a procedure of an air-conditioning switching action in a modification.

FIG. 6 is a flowchart showing a procedure of the air-conditioning switching action in the modification. The flowchart is repeatedly executed whenever a previously decided condition is satisfied (for example, every predetermined period).

First, in step ST11, it is determined whether the control system of the vehicle 1 is in the Ready-ON state. That is, it is determined whether the control system of the vehicle 1 is in the Ready-ON state as the user has pushed the start switch 44 while depressing the brake pedal, as described above.

In the case where the control system of the vehicle 1 is not in the Ready-ON state (for example, the control system of the vehicle 1 is in an ON mode in which only the actuation of the electric item is permitted) and the NO determination is made in step ST11, the procedure transitions to step ST2, and the air-conditioning state (the air-conditioning operation in the internal-air circulation mode) in the current control mode (for example, the ON mode) is maintained.

On the other hand, in the case where the control system of the vehicle 1 is in the Ready-ON state and the YES determination is made in step ST11, the procedure transitions to step ST3, and it is determined whether the current temperature in the vehicle cabin has reached the predetermined value. The action after step ST3 is the same as that in the above embodiment, and therefore descriptions of the action will be omitted.

The modification provides the same effects as the above embodiment. That is, before the surrounding temperature of the occupant that sits on the rear seat 81 significantly rises due to the heat generated by the electric storage device 10 or the electric item ED and the occupant feels uncomfortable, by restraining the surrounding temperature from rising through the external-air introduction to avoid a situation in which the occupant feels uncomfortable, it is possible to maintain the comfortableness in the vehicle cabin. Further, by the air-conditioning switching action, the external air for the ventilation is blown toward the occupant that sits on the rear seat 81. Therefore, it is possible to surely avoid the occupant feeling uncomfortable as a result of a significant rise in the surrounding temperature of the occupant due to the heat generated by the electric storage device 10 or the electric item ED, and it is possible to contribute to the maintenance of the comfortableness in the vehicle cabin. Further, it is possible to achieve both the securement of the comfortableness in the vehicle cabin and the enhancement in energy efficiency by keeping the air-conditioning load as low as possible.

Other Embodiments

The present disclosure is not limited to the embodiment and the modification, and various modifications and applications that are included in the scope of the claims and a scope equivalent to the scope of the claims can be made.

For example, in the embodiment and the modification, the case where the present disclosure is applied to the plug-in hybrid vehicle 1 has been described. The present disclosure is not limited to this, and can also be applied to an electric vehicle, a hybrid vehicle, a conventional vehicle and the like. Each of the hybrid vehicle and the conventional vehicle is not a vehicle that charges an electric storage device mounted on the vehicle by receiving supply of alternating-current power from an electric supply device (external power source). Therefore, the present disclosure is applied to a vehicle that allows the my-room electricity generation mode to be set as the my-room mode, for example.

In the embodiment and the modification, in the case where the electric storage device 10 or the electric item ED is arranged below the seat portion 81a of the rear seat 81, the rear air-conditioning unit 300 is controlled as the air-conditioning switching action. The present disclosure is not limited to this, and in the case where the electric storage device 10 or the electric item ED is arranged below the seat portion of the front seat, the front air-conditioning unit 200 may be controlled as the air-conditioning switching action. That is, when the temperature of the device (the electric storage device 10 or the electric item ED) arranged below the seat portion of the front seat exceeds the predetermined value, the suction port mode of the front air-conditioning unit 200 is switched to the external-air introduction mode, the blowing mode is switched to the FACE mode, or the air-conditioning performance is increased. Further, in the case where the electric storage device 10 or the electric item ED is arranged below the seat portion 81a of the rear seat 81, not only the rear air-conditioning unit 300 but also the front air-conditioning unit 200 may be controlled as the air-conditioning switching action. That is, when the temperature of the device arranged below the seat portion 81a of the rear seat 81 exceeds the predetermined value, each suction port mode of the rear air-conditioning unit 300 and the front air-conditioning unit 200 is switched to the external-air introduction mode, and in addition, each blowing mode is switched to the FACE mode, or each air-conditioning performance is increased.

In the embodiment and the modification, the case where the electric storage device 10 and the electric item ED is arranged below the seat portion 81a of the rear seat 81 has been described. The present disclosure is not limited to this, and can also be applied to a case where the electric storage device 10 or the electric item ED is arranged within the rear seat 81, a case where the electric storage device 10 or the electric item ED is arranged within the front seat, and a case where the electric storage device 10 or the electric item ED is arranged below or within another interior item (for example, a center console box).

The present disclosure can be applied to a plug-in hybrid vehicle that allows the my-room mode to be executed.

What is claimed is:

1. A vehicle air-conditioner that allows an external-air introduction mode to be set as a suction port mode for air-conditioning operation, the external-air introduction mode being a mode in which external air is introduced into a vehicle cabin of a vehicle, the vehicle air-conditioner comprising:
   a device that includes an electric component or an electronic component and that is installed below an interior item in the vehicle cabin or within the interior item; and
   a temperature detector that is configured to detect a temperature of the device; and
   a processor that is configured to set the suction port mode, wherein
   the processor is configured to
      in response to a control mode of the vehicle being set to a my-room mode,
         set the suction port mode to an internal-air recirculation mode until a temperature in the vehicle cabin reaches a predetermined temperature during the air-conditioning operation in the vehicle cabin, the internal-air recirculation mode being a mode in which air in the vehicle cabin is recirculated, and
         perform an air conditioning switching action in response to the temperature of the device that is detected by the temperature detector exceeding a predetermined value in a state where the temperature in the vehicle cabin has reached the predetermined temperature during the air-conditioning operation in the vehicle cabin,
   the air conditioning switching action is an action by which the suction port mode is switched to the external-air introduction mode from the internal-air recirculation mode, and
   in the my-room mode, a traveling of the vehicle is prohibited and an actuation of the vehicle air-conditioner is permitted.

2. The vehicle air-conditioner according to claim 1, wherein
   the vehicle air-conditioner allows a FACE mode to be set as a blowing mode for the air-conditioning operation, the FACE mode being a mode in which air-conditioning wind is blown toward an occupant, and
   in the air-conditioning switching action, the blowing mode is set to the FACE mode.

3. The vehicle air-conditioner according to claim 1, wherein
   a front seat and a rear seat are disposed in the vehicle cabin as the interior item,
   the vehicle air-conditioner comprises a front air-conditioning unit configured to blow air-conditioning wind toward the front seat and a rear air-conditioning unit configured to blow the air-conditioning wind toward the rear seat,
   the device is installed below or within the rear seat, and
   in the air-conditioning switching action, a suction port mode of the rear air-conditioning unit is set to the external-air introduction mode and air-conditioning performance of the rear air-conditioning unit is increased.

4. The vehicle air-conditioner according to claim 1, wherein
   the electric component is a secondary battery configured to be charged by receiving electric power,
   the electronic component is an electric item configured to be connected to an electronic apparatus and supply the electric power to the electronic apparatus, and
   the air-conditioning switching action is performed in response to at least one of a temperature of the secondary battery or a temperature of the electric item exceeds the predetermined value in a state that the electric power is supplied to the electronic apparatus through the electric item during charge of the secondary battery, the temperature of the secondary battery and the temperature of the electric item being detected by the temperature detector.

5. The vehicle air-conditioner according to claim 1, wherein
   the device includes
      the electric component defined by a secondary battery configured to be charged by receiving electric power; and
      the electronic component defined by an electric item configured to be connected to an electronic apparatus and supply the electric power to the electronic apparatus.

6. The vehicle air-conditioner according to claim 5, wherein
   the processor is configured to, in response to (i) a temperature of the secondary battery exceeding a first predetermined value or (ii) the temperature of the secondary battery being equal to or below the first predetermined value and a temperature of the electric item exceeding a second predetermined value, switch the suction port mode to the external-air introduction mode from the internal-air recirculation mode.

7. The vehicle air-conditioner according to claim 6, wherein
   the second predetermined value is greater than the first predetermined value.

8. The vehicle air-conditioner according to claim 5, wherein
   the processor is configured to, in response to a temperature of the secondary battery exceeding a first predetermined value, switch the suction port mode to the external-air introduction mode from the internal-air recirculation mode.

9. The vehicle air-conditioner according to claim 5, wherein
   in the my-room mode and in the state where the temperature in the vehicle cabin has reached the predetermined temperature during the air-conditioning operation in the vehicle cabin, the processor is configured to, in response to a temperature of the secondary battery being equal to or below a first predetermined value and a temperature of the electric item exceeding a second predetermined value, switch the suction port mode to the external-air introduction mode from the internal-air recirculation mode, the second predetermined value being greater than the first predetermined value.

* * * * *